United States Patent [19]

Fuller

[11] Patent Number: 5,463,371
[45] Date of Patent: Oct. 31, 1995

[54] WINDOW MOUNTED AUTOMOBILE SECURITY ALARM

[75] Inventor: Russell Fuller, Huntington Beach, Calif.

[73] Assignee: Coyote Enterprises, Inc., Anaheim, Calif.

[21] Appl. No.: 242,599

[22] Filed: May 13, 1994

[51] Int. Cl.⁶ .................................................. B60R 25/10
[52] U.S. Cl. ........................ 340/426; 340/425.5; 340/429; 340/566; 307/10.2; 116/33
[58] Field of Search ........................... 340/425.5, 426, 340/429, 566; 307/10.2; 116/33

[56] References Cited

U.S. PATENT DOCUMENTS

| | | | |
|---|---|---|---|
| 3,827,038 | 7/1974 | Willis | 340/539 |
| 3,864,675 | 2/1975 | Colibert | 340/539 |
| 4,155,067 | 5/1979 | Gleeson | 340/429 |
| 4,187,497 | 2/1980 | Howell et al. | 340/429 |
| 4,257,038 | 3/1981 | Rounds et al. | 340/539 |
| 4,290,043 | 9/1981 | Kaplan | 340/984 |
| 4,337,454 | 6/1982 | Iwata | 340/426 |
| 4,797,663 | 1/1989 | Rios | 340/691 |
| 4,885,572 | 12/1989 | Iwata et al. | 340/425.5 |
| 5,055,823 | 10/1991 | Fullert | 340/426 |

Primary Examiner—John K. Peng
Assistant Examiner—Daryl C. Pope
Attorney, Agent, or Firm—Fulwider Patton Lee & Utecht

[57] ABSTRACT

A portable automobile alarm hung over the top of an automobile side window is secured in place by raising the window into its frame. The portion of the unit positioned on the interior side of the glass contains a sensor, a receiver, and associated electronic circuitry. The exterior unit houses an alarm siren. The unit is powered from an internal battery or from a cigarette lighter. The unit may be armed and disarmed by a remote transmitter.

17 Claims, 3 Drawing Sheets

WINDOW MOUNTED AUTOMOBILE SECURITY ALARM

BACKGROUND OF THE INVENTION

1. Field of the Invention

The invention relates to portable automobile security alarms, and more particularly to a window mounted alarm having a siren mounted externally to the window.

2. Description of the Prior Art

Automobile theft is a pervasive problem. In the past, various types of automobile protection systems have been devised to protect automobiles from theft. Such alarm systems are secured to the automobile frame or chassis and move with the car upon a tampering attempt. Such systems contain motion sensors operative to detect tampering or movement of the automobile to trigger an alarm. The alarms can be acoustic alarms designed to announce intrusions, deter further intrusions, and attract help from passers by. Such systems are generally powered by the car battery.

Automobile alarm systems have been connected with the automobile car horn to generate the acoustic alarm. These systems are permanently installed in the vehicle and require a considerable amount of time and labor thus being far from portable. Such systems require some degree of skill to mount on an automobile and are expensive to manufacture and install. Because such systems are electronically sophisticated they are often prone to malfunction.

New and used cars on sales lots are an open invitation to thieves and vandals. It is impractical to install a permanent alarm system on a car that may only be on the lot for a few days. Thus, portable and detachable alarm systems are useful for businesses with a great turnover of automobiles, such as automobile dealerships. They can be easily removed and replaced as cars are sold. Portable alarms are easily mounted, inexpensive to make and purchase, and give the user the option of utilizing the device on multiple vehicles. Generally, a siren within the alarm unit is used instead of the horn. Because of their portable nature, the capacity of the power source is limited.

Disturbance sensitive portable automobile alarm devices have been designed to hang over the top edge of a side window of an automobile with compartment like structures on both sides. The devices can utilize a motion sensor and an internal power source within the interior compartment and can generate an audible alarm and/or transmit a radio frequency ("RF") signal upon activation. Indicator lights on the device provide an indication of active status. Examples of such devices can be found in U.S. Pat. Nos. 4,155,067 to Gleeson and 4,187,497 to Howell et al. While serving their intended purpose of sounding an alarm such devices suffer the shortcoming that, for instance, the alarm of Gleeson is in two separable and easily disconnectable parts and the alarm of Howell et al. fails to afford propagation of the audible alarm at a sufficiently high intensity to ensure a reasonably adequate range.

The intensity of an automobile alarm is an important component in its ability to provide an effective deterrent. A shortcoming of smaller portable alarms is that they are often not as loud as permanent alarms that utilize the automobile horn. Their power supply and size limit the intensity of range of the alarm annunciator.

SUMMARY OF THE INVENTION

The invention provides a portable window hanging automobile alarm having an electronic housing in juxtaposition with an alarm housing. The respective housings are connected by a flat hanger spring assembly incorporating a pair of sheet spring strips having sandwiched therebetween electrical conductors. A control switch and a port for receipt of an electrical lead leading from a cigarette lighter socket are carried on the electronic housing. The outwardly facing side of such electronic housing mounts one or more cylindrical rubber bumpers to abut the window and cooperate in pressing the alarm housing firmly against the window. The alarm housing is formed on its outwardly facing side with an acoustic transducer and on its rearward side with an exciter cap into which the hub of an acoustic driver nests. The exciter cap is configured in relationship to the respective bumpers so that a user can roll an automobile window partially down and spread the electronic housing and alarm housing apart against the bias of the hanger spring for receipt therebetween of the window. The hanger spring is lowered to rest on the upper edge of the window and the window can be raised to trap the hanger spring between the top edge of the window and the window frame so that the electronic housing is maintained interior of the window and the alarm housing exterior of the window. The electronic housing is pressed against the window so that, in the event the automobile is disturbed causing movement, such movement will be positively communicated to a tamper sensor within the electronic housing. The tamper sensor generates a tamper signal in response to the movement. The tamper signal causes the acoustical driver to initiate audible vibrations from the acoustic transducer. Such vibrations are imparted directly to the surface of the window by the exciter cap initiating corresponding vibration of the window to enhance propagation of the alarm sound.

Other features and advantages of the invention will become apparent from the following detailed description, taken in conjunction with the accompanying drawings, which illustrate, by way of example, the features of the invention.

DESCRIPTION OF THE PREFERRED EMBODIMENT

Figure 1:
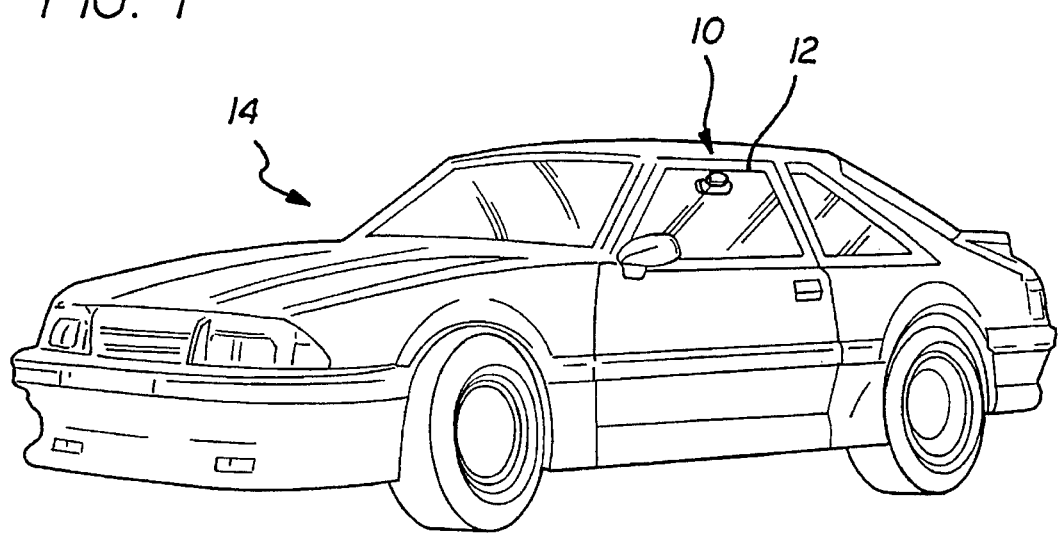
FIG. 1 is a perspective view of a window mounted automobile security alarm mounted on an automobile window.

As shown in the drawings, for purposes of illustration, the present invention is embodied in a window mounted automobile security alarm. The portable alarm includes an electronic housing connected to an alarm housing by a hanger spring. The alarm is mounted on a side window of an automobile and is responsive to shock and motion to generate an acoustical alarm. The electronic housing is positioned on the inside of the automobile protected from the elements while the metallic alarm housing is on the outside enhancing the loudness of the alarm siren.

In accordance with the present invention, the window mounted automobile security alarm includes an exterior alarm housing mounted in abutment with the side window of the automobile. An acoustic transducer is mounted on the outwardly facing side of the alarm housing. An acoustic driver is mounted in the alarm housing. A tamper detector mounted within the interior electronic housing is electrically coupled to the acoustical driver. The tamper detector is responsive to shock and motion to operate the acoustic driver to drive an acoustical alarm from the acoustic transducer. When in mounted position, the exterior alarm housing is urged toward the interior electronic housing by the bias of the hanger spring assembly. An exciter cap mounted on the rearward side of the alarm housing directly confronts and is held firmly in positive contact with the exterior surface of the window which correspondingly vibrates to enhance propagation of the acoustic alarm.

Figure 2:
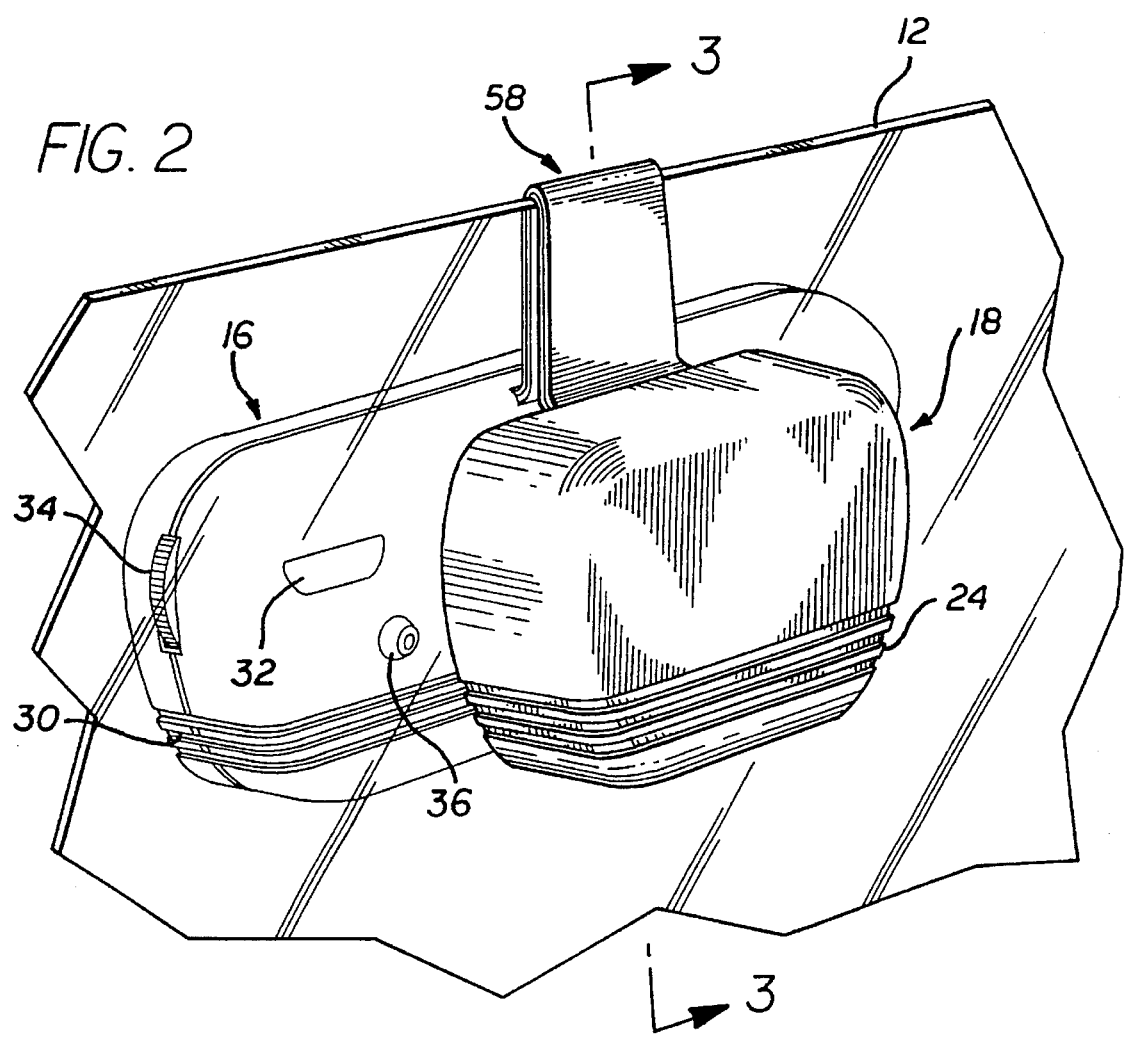
FIG. 2 is an enlarged, perspective view of the window mounted automobile alarm shown in FIG. 1.

The portable alarm apparatus 10 of the present invention is mounted over the top edge 12 of a automobile side window on an automobile 14 and is secured between the top edge 12 of the window and the window frame, as shown in FIG. 1. The electronic housing 16 is positioned within the interior of the automobile protected from the elements and away from the hands of vandals, as shown in FIG. 2. The alarm housing 18 is electrically coupled to the electronic housing 16 and is responsive to shock to the electronic housing 16 and motion of the electronic housing carried by the car to propagate an audible annunciator alarm. The housings are colored red for high visibility. A rigid metallic exciter cap 20 (FIG. 3) mated to an exciter aperture of the alarm housing 18 vibrates against the exterior surface 22 of the window in response to propagation of the alarm by the acoustic transducer. This causes the window to vibrate contemporaneously with the exciter cap 20 to reinforce the sound intensity of the alarm apparatus 10.

The alarm housing 18 is molded from a metal alloy and is formed in its outwardly facing wall with a sound grille 24 (FIG. 3) through which the acoustic transducer propogates the alarm sound. An exciter aperture is formed on a rearward side of the alarm housing opposite to the front face of the alarm housing. The exciter cap 20 consisting of a rigid, bulbous metal member is mated through the exciter aperture to the alarm housing and is coupled to the acoustic driver 26 (FIG. 4) within the alarm housing 18. The acoustic transducer 28 (FIG. 4) is in the form of a metallic loudspeaker siren. The siren is weather, freon, and shatter proof. The acoustic driver 26 is responsive to an alarm signal from the electronic housing to generate a driver signal. The loudspeaker is responsive to the driver signal to generate sound waves. The exciter cap 20 (FIG. 3) is biased positively against the surface 22 of the window forcing it to vibrate in unison with the exciter cap when the acoustic driver 26 (FIG. 4) is activated.

The electronic housing 16 (FIG. 3) is formed of an elongated plastic casing. A light emitting diode ("LED") array 32 (FIG. 2) is disposed on the electronic housing and is capable of indicating that the device is armed. A rotary sensitivity control thumb knob 34 is mounted on and extends through a slot in the electronic housing for adjusting the activation level of an internal microphone acting as a sound sensor. A port (not shown) for receipt of an electrical lead from the car cigarette lighter is formed through the plastic housing and connects in parallel with the dry cell batteries to provide for access to an alternative twelve volt power source. A plurality of conical shaped rubber bumpers 36 are equidistantly positioned on the inwardly facing side of the electronic housing 16.

Figure 4:
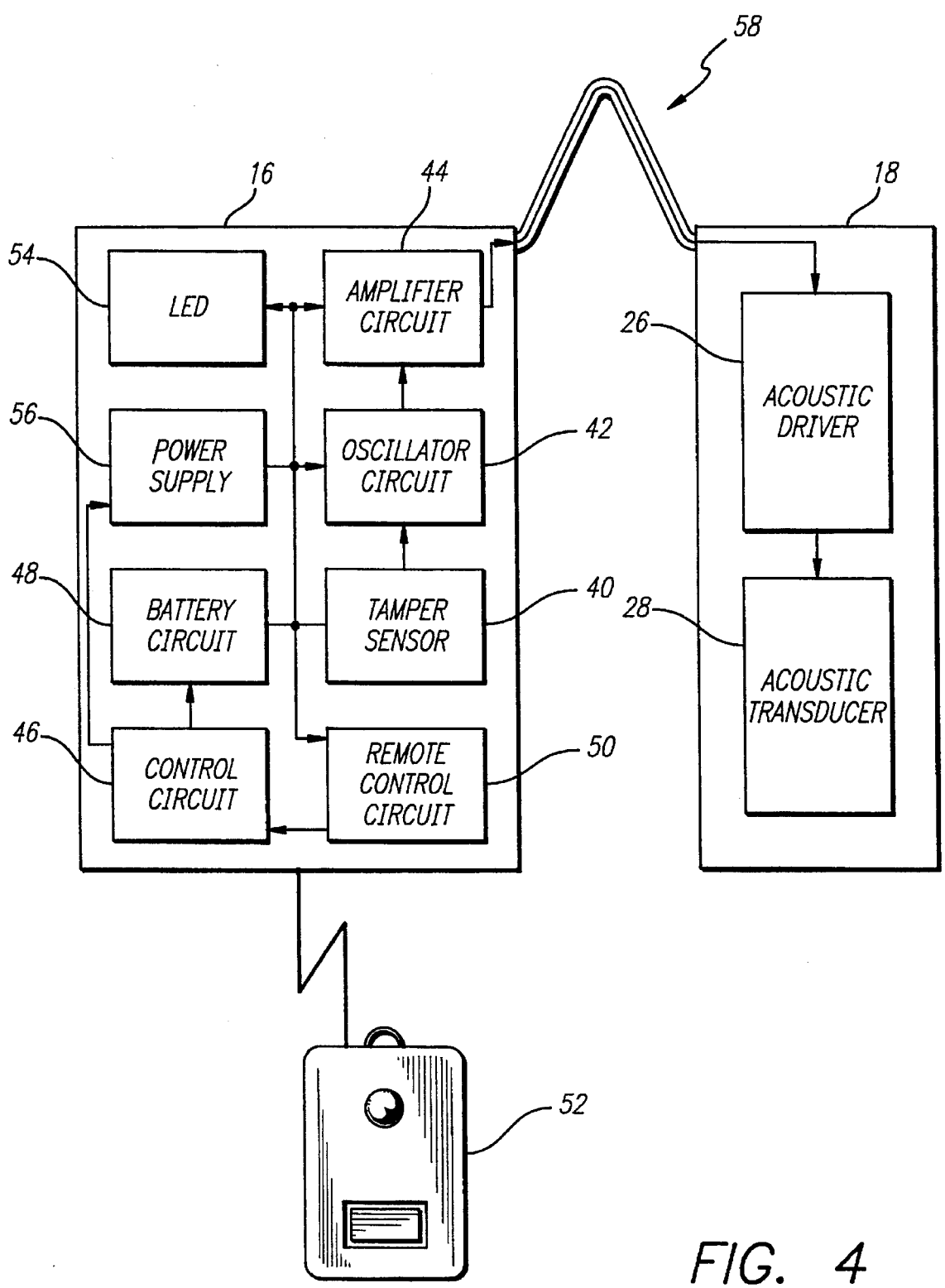
FIG. 4 is a schematic representation of electrical circuits and components in the window mounted automobile security alarm shown in FIG. 1.

Referring to FIG. 4, a tamper sensor 40 is mounted within an actuation compartment in the electronic housing. The tamper sensor 40 includes both a shock and motion detector. In the preferred embodiment, such detector includes an electrically insulative housing with a plurality of spaced electrical contacts configured to define a recessed nest into which an electrically inductive spherical ball normally rests. Upon shifting of the housing due to movement of the car, the ball will roll from its rest position budging between a pair of adjacent contacts thus actuating the control circuit. The tamper sensor may also include a microphone and band pass filter for detecting the sound frequencies of breaking glass. The tamper sensor generates a tamper signal in response to shock to, tampering with, or motion near the actuation compartment.

Various electrical circuits are employed within the electronic housing to control operation of the portable automobile alarm. An oscillator circuit 42 for generating a characteristic alarm siren waveform is coupled to the tamper sensor. The oscillator circuit is responsive to the tamper signal to generate an oscillator signal. An amplifier circuit 44 is coupled to the oscillator circuit. The amplifier amplifies the oscillator signal to generate an alarm signal that is passed to the acoustic driver 26 in the alarm housing 18.

A control circuit 46 supplies power to the active components and circuitry of the electronic housing from an internal battery supply 48 or an external supply, such as from an automobile cigarette lighter. The control circuit (FIG. 2) includes an on-off switch having a thumb slider 57 (FIG. 3) projecting through a slot in the housing 16.

Referring to FIG. 4, a remote control receiver circuit 50 is coupled to the control circuit 46 and is operative to control the control circuit 46. The remote control transmitter 52 is coupled to the remote control receiver circuit 50 by an RF communications link. The transmitter 52 is operative to generate a transmitter signal which is discernable at distances up to 100 feet from the receiver 50. The receiver circuit 50 is responsive to the transmitter signal to disable the alarm through the control circuit 46.

An LED circuit 54 is coupled to the control circuit 46. The LED circuit illuminates the LED array 32 when the control circuit 46 is supplying power to the active components and circuitry in the electronic housing. The illuminated LED array indicates that the alarm is armed.

The internal battery supply 48 and a power supply circuit 56 are coupled to the control circuit 46. Two nine volt batteries are utilized internally. The power supply circuit 56 is electrically coupled to the electrical port through the electronic housing for receipt of an electrical lead coupled to for instance, the automobile cigarette lighter. The power supply circuit 56 functions as a twelve volt adapter circuit.

Figure 3:
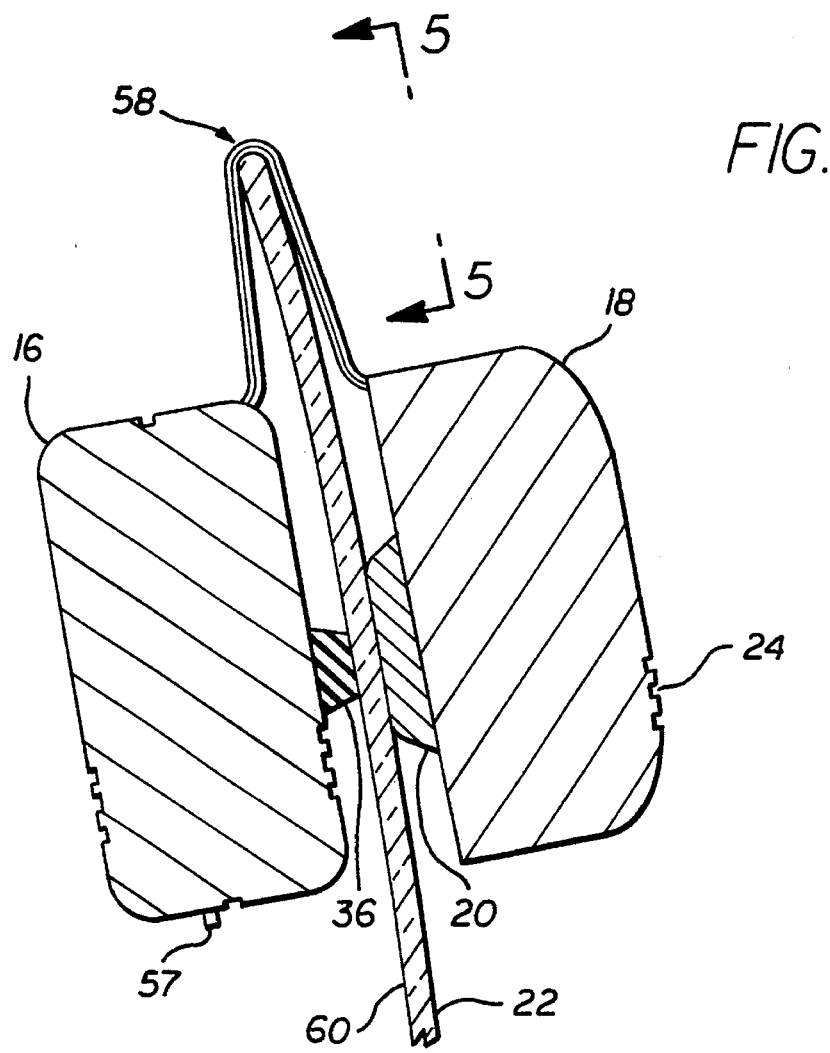
FIG. 3 is a transverse sectional view taken along line 3—3 of FIG. 2.
Figure 5:
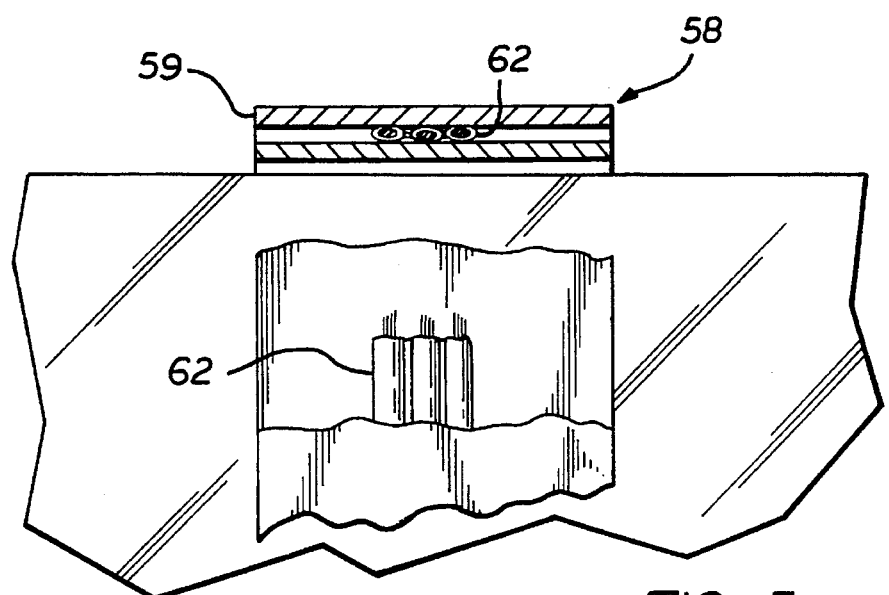
FIG. 5 is a partial front view, partly in cut-away section, of the automobile alarm shown in FIG. 2.

Referring to FIG. 3, the hanger spring assembly 58 coupling the electronic housing 16 with the alarm housing 18 is formed from a pair of sturdy and resilient U-shaped sheet metal springs 59 (FIG. 5). The sheet springs a opposite ends to the respective housings. The hanger spring assembly biases the alarm housing toward the electronic housing to sandwich the side window 22 of the automobile firmly between the cylindrical bumpers 36 and the exciter cap 20 so that vibration of such cap is imparted directly to the window.

A plurality of electrical conductors 62 electronically link the two housings, as shown in FIG. 5. The electrical conductors 62 are copper wire encased in plastic sheaths. The conductors 62 are sandwiched between the U-shaped sheet springs 59 of the hanger spring assembly 58, as shown in FIG. 5. The amplifier circuit 44 (FIG. 4) in the electronic housing 16 is operative to pass an alarm signal to the acoustic driver 26 (FIG. 4) in the alarm housing via the electrical conductors.

In operation, the hanger spring assembly 58 (FIG. 2) of the window mounted automobile alarm is mounted over the top edge 12 (FIG. 2) of the window by the user. The window is then raised to secure the alarm to the automobile. With the switch 34 on, the alarm apparatus is armed by operating the remote control transmitter 52 (FIG. 4). Once armed, the LED array 32 (FIG. 2) flashes indicating an active status to the user and warning a potential unauthorized intruder that the device is activated.

Should an unauthorized person jar or shake the electronic housing 16 (FIG. 2 or otherwise create a loud noise or jack up one of the car wheels to move the sensor ball off the supporting contacts to actuate the electrical circuit, the sensor 40 (FIG. 4) within the electronic housing will register a tamper attempt. The tamper sensor then passes a tamper signal to the oscillator circuit 42 in the electronic housing which is responsive thereto to generate an oscillator signal. The oscillator signal is passed to the amplifier circuit 44 and amplified to generate the alarm signal. The alarm signal is conducted through the electrical conductors 62 (FIG. 5) within the hanger spring assembly 58 to the acoustic driver 26 (FIG. 4) in the alarm housing 18. The acoustic driver then responds to drive the acoustic transducer to generate an acoustic alarm broadcast through the sound grille 24 (FIG. 3) on the outwardly facing side of the alarm housing. The acoustic driver 26 (FIG. 4) vibrates the exciter cap 20 (FIG. 3) as it drives the acoustic transducer 28. The exciter cap is operative to impart vibration directly to the window 22 causing the window to propagate acoustical vibrations to reinforce the intensity of the audible alarm. It will be appreciated that the resilient bumpers 36 flex somewhat under the vibratory movement of such window, thus allowing for relatively uninhibited vibration of such window to thereby reinforce the propagation of sound waves. Propagation of this reinforced acoustic signal provides a substantial range of a highly intensive acoustic alarm which tends to deter all but the most persistent intruders. The high pitch affords a perceptible alarm at such a great distance that passers by are likely to be attracted to the violated automobile. When it is desirable to disarm or remove the alarm, the operator can open the car door, disarm the alarm, roll down the window and remove the alarm to be installed in another automobile.

From the foregoing it will be appreciated that the window mounted security alarm is portable and easily installed on automobiles, boats, and homes. The alarm apparatus design having the alarm siren outside of the automobile or other vehicle interior enables the alarm apparatus to generate an alarm much louder than would be the case if the alarm siren was within the interior of the automobile. The alarm apparatus provides a piercing 110 db alarm that is equivalent, because of its exterior positioning, to a 130 db under the hood mounted alarm. Importantly, the urged confrontation of the exciter cap against the window causes the window to vibrate in unison with the exciter cap, further measurably increasing the sound intensity of the acoustic alarm.

While a particular form of the invention has been illustrated and described, it will be apparent that various modifications can be made without departing from the spirit and scope of the invention.

What is claimed is:

1. A portable automobile alarm apparatus removably hangable on the top edge of a side window of an automobile and comprising;

a pair of first and second elongated coextensive housings, said first housing including an actuation compartment and said second housing including an alarm compartment formed in one side with a sound grille;

a pair of spaced apart resilient bumpers mounted on a wall of said first housing facing toward said second housing;

a tamper sensor in said first housing responsive to tampering with said actuation compartment to generate a tamper signal;

a dry cell battery in said first housing;

an electrical circuit in said first housing connected with said battery and said tamper sensor and responsive to said tamper signal to generate an alarm signal;

a power supply circuit in said first housing, coupled to said electrical circuit for coupling to a 12 volt battery source;

an alarm device in said second housing and including an acoustic driver operative in response to said alarm signal to generate an acoustic alarm to propagate through said grille;

a plurality of insulated electrical leads leading from said electrical circuit out of said first housing and into said second housing to connect with said alarm device for communicating said alarm signal; and a pair of flat U-shaped hanger springs for hanging over said top edge and carrying on their respective opposite ends said first and second housings, said springs sandwiching therebetween said plurality of electrical leads and configured to enable said housings to be spread apart for receipt over said top edge to mount said alarm apparatus from said window and said power supply circuit either connected to said 12 volt battery source or to said dry cell battery for operating by either said dry cell battery or said 12 volt battery source.

2. A portable automobile alarm as recited in claim 1 including:

an oscillator circuit disposed in said first housing and responsive to said tamper signal to generate an oscillator signal;

an amplifier circuit disposed in said first housing and connected in circuit to said oscillator circuit and responsive to said oscillator signal to generate said alarm signal;

a control switch mounted through said first housing;

a control circuit connected in circuit to said control switch and responsive to actuation thereof to disable said oscillator signal;

said acoustic driver is responsive to said alarm signal to generate a driver signal; and an acoustic transducer disposed in said second housing and connected in circuit to said acoustic driver and responsive to said driver signal to generate said acoustic alarm.

3. A portable automobile alarm as recited in claim 1 wherein:

said pair of bumpers are formed of rubber and provides purchase on said window for said first housing against the bias of said pair of hanger springs.

4. A portable automobile alarm as recited in claim 1 comprising:

a remote transmitter operative to generate a transmitter signal; and a receiver in said first housing responsive to said transmitter signal to generate a receiver signal and said electrical circuit is responsive to said receiver signal to terminate said alarm signal.

5. A portable automobile alarm apparatus removably hangable on the top edge of a side window of an automobile and comprising:

a pair of first and second elongated coextensive housings, said first housing including an actuation compartment, said second housing including an alarm compartment formed in one side with a sound grille;

a pair of spaced apart resilient bumpers mounted on the wall of said first housing adjacent said second housing;

a tamper sensor in said first housing responsive to tampering with said actuation compartment to generate a tamper signal;

an electrical circuit in said first housing including a dry cell battery supply circuit and responsive to said tamper signal to generate an alarm signal, and further responsive to a predetermined receiver signal to terminate said alarm signal;

an alarm device in said second housing and including an acoustic driver for generating an audible alarm signal for propagation through said grille;

a remote transmitter including a switch actuable to generate an RF transmitter signal;

a receiver in said first housing connected with said electrical circuit and responsive to said RF transmitter signal to generate said predetermined receiver signal;

a plurality of insulated electrical leads leading from said electrical circuit out of said first housing and into said second housing to connect with said alarm device for communication an alarm signal; and a pair of flat U-shaped hanger springs for hanging over said top edge and carrying on their respective opposite ends said first and second housings, said springs sandwiching therebetween said plurality of electrical leads and configured to enable said housings to be spread apart for receipt over said top edge.

6. A portable automobile alarm as recited in claim 5 wherein said tamper sensor includes:

a motion sensor.

7. A portable automobile alarm as recited in claim 5 wherein said tamper sensor includes:

a microphone; and a band pass filter.

8. A portable automobile alarm as recited in claim 5 wherein said first housing includes:

a plastic casing formed with regularly spaced ventilation slats thereon.

9. A portable automobile alarm as recited in claim 5 comprising:

a power supply circuit in said first housing coupled to said electrical circuit for coupling to a 12 volt automobile battery source.

10. A portable automobile alarm as recited in claim 5 further comprising:

an oscillator circuit in said electrical circuit responsive to said tamper signal to generate an oscillator signal; and an amplifier circuit in said electrical circuit responsive to said oscillator signal to generate said alarm signal.

11. A portable automobile alarm apparatus as recited in claim 10 further comprising:

a power supply circuit electrically coupled to said amplifier circuit to provide a bias voltage for said amplifier circuit; and an electrical port formed through said first housing coupled to said power supply circuit.

12. A portable automobile alarm as recited in claim 5 further comprising:

a control switch circuit coupled to said electrical circuit.

13. A portable automobile alarm as recited in claim 5 that includes:

sensitivity means for adjusting the sensitivity of said tamper sensor.

14. A portable automobile alarm apparatus removably hangable on the top edge of a side window of an automobile and comprising:

a pair of first and second elongated coextensive housings, said first housing including an actuation compartment and said second housing including an alarm compartment formed in one side with a sound grille;

a pair of spaced apart resilient bumpers mounted on the wall of said first housing adjacent said second housing;

a tamper sensor in said first housing responsive to tampering with said actuation compartment to generate a tamper signal;

a dry cell battery circuit in said first housing;

an electrical circuit in said first housing connected with said dry cell battery circuit and tamper sensor and responsive to said tamper signal to generate an alarm signal;

an oscillator circuit in said first housing, connected with said electrical circuit and responsive to said tamper signal to generate an oscillator signal, an amplifier circuit connected to said oscillator circuit and responsive to said oscillator signal to condition said oscillator signal into said alarm signal and a control switch mounted through said first housing;

a control circuit connected with said switch and electrical circuit and responsive to actuation of said control switch to disable said oscillator signal;

an alarm device in said second housing responsive to said alarm signal to generate a driver signal;

an acoustic transducer in said second housing, connected to said alarm device and responsive to said driver signal to generate said acoustic alarm;

a plurality of insulated electrical leads leading from said electrical circuit out of said first housing and into said second housing to connect with said alarm device for communication of said alarm signal; and a pair of flat U-shaped hanger springs for hanging over said top edge and carrying on their respective opposite ends said first and second housings.

15. A portable automobile alarm as recited in claim 14 comprising:

an LED circuit disposed in said first housing responsive to actuation of said control switch to generate an LED signal; and an LED array formed on said first housing illuminating in response to said LED signal.

16. A portable automobile alarm as recited in claim 14 further comprising:

a remote control receiver circuit coupled to said electrical circuit and operative to disable said electrical circuit.

17. A portable automobile alarm as recited in claim 16 further comprising:

a remote control transmitter communicatively coupled to said remote control receiver circuit.

* * * * *